(12) United States Patent
Uber et al.

(10) Patent No.: US 8,323,430 B2
(45) Date of Patent: Dec. 4, 2012

(54) APPARATUS AND A METHOD FOR THE PROVISION OF ACTIVATED INDICATORS FOR PRODUCT MARKING AND A PRODUCT MARKING

(75) Inventors: Markus Uber, Pfullingen (DE); Juergen Bernhard, Empfingen (DE); Michael Feuerstack, Dortmund (DE); Uwe Jannasch, Dortmund (DE)

(73) Assignee: Bizerba GmbH & Co. KG, Balingen (DE)

( * ) Notice: Subject to any disclaimer, the term of this patent is extended or adjusted under 35 U.S.C. 154(b) by 1491 days.

(21) Appl. No.: 11/661,824

(22) PCT Filed: Jul. 27, 2006

(86) PCT No.: PCT/EP2006/007457
§ 371 (c)(1),
(2), (4) Date: Mar. 2, 2007

(87) PCT Pub. No.: WO2007/045290
PCT Pub. Date: Apr. 26, 2007

(65) Prior Publication Data
US 2009/0229734 A1     Sep. 17, 2009

(30) Foreign Application Priority Data
Oct. 21, 2005   (DE) .................. 10 2005 051 471

(51) Int. Cl.
*B65C 9/46* (2006.01)
*G01K 1/02* (2006.01)
(52) U.S. Cl. .... 156/64; 156/378; 156/272.2; 156/273.3; 156/379.6; 156/379.8; 156/238; 156/241; 156/249; 156/230; 156/235; 156/540; 156/541; 116/216
(58) Field of Classification Search .............. 156/64
See application file for complete search history.

(56) References Cited

U.S. PATENT DOCUMENTS

| | | | | |
|---|---|---|---|---|
| 3,999,946 | A | * | 12/1976 | Patel et al. ............ 422/56 |
| 4,535,456 | A | * | 8/1985 | Bauer et al. ............ 714/31 |
| 5,441,586 | A | * | 8/1995 | Fukunaga et al. ........ 156/387 |

(Continued)

FOREIGN PATENT DOCUMENTS

DE      198 03 208 A1    8/1999

(Continued)

OTHER PUBLICATIONS

U.S. Appl. No. 11/762,863-001 X1.*

*Primary Examiner* — Philip Tucker
*Assistant Examiner* — Vicki Wu
(74) *Attorney, Agent, or Firm* — Kilpatrick Townsend & Stockton LLP

(57) ABSTRACT

The invention relates to a method for the provision of activated temperature-sensitive and/or time-sensitive indicators for product marking. A first variant is characterized by the activation of an indicator and the subsequent application of a protective filter to the indicator, with the indicator being conveyed along an activation device and along a protective filter application unit subsequent to it in the conveying direction. A second variant is characterized by the activation of an indicator already provided with a protective filter.
The invention furthermore relates to apparatus for the carrying out of the named methods as well as to a product marking which was manufactured in accordance with the methods in accordance with the invention.

61 Claims, 5 Drawing Sheets

U.S. PATENT DOCUMENTS

| | | |
|---|---|---|
| 2002/0168212 A1 | 11/2002 | Nedblake, Jr. et al. |
| 2003/0030167 A1* | 2/2003 | Dunk .......................... 264/40.6 |
| 2003/0230991 A1* | 12/2003 | Muthu et al. .................. 315/307 |
| 2004/0013839 A1* | 1/2004 | Ko et al. ...................... 428/40.1 |
| 2004/0163556 A1* | 8/2004 | Kugo et al. ................... 101/226 |
| 2004/0164325 A1* | 8/2004 | Siegel ........................... 257/200 |
| 2004/0200566 A1* | 10/2004 | Bellafore et al. ............. 156/230 |
| 2004/0211522 A1* | 10/2004 | Fries et al. .................... 156/443 |
| 2005/0280683 A1* | 12/2005 | Custer .......................... 347/102 |
| 2007/0150219 A1* | 6/2007 | Cawker et al. ................. 702/82 |
| 2007/0172951 A1* | 7/2007 | Levy et al. ........................ 436/5 |

FOREIGN PATENT DOCUMENTS

| | | |
|---|---|---|
| DE | 19803208 A1 | 8/1999 |
| DE | 199 29 849 A1 | 1/2001 |
| DE | 19929849 A1 | 1/2001 |
| DE | 10202381 A1 | 1/2002 |
| DE | 103 37 402 A1 | 3/2005 |
| EP | 0149784 A2 | 7/1985 |
| EP | 0433575 A1 | 6/1991 |
| GB | 1297 195 A | 11/1972 |
| SU | 400123 A3 | 10/1973 |
| WO | WO 96/28714 A | 9/1996 |
| WO | WO 96/28714 A1 | 9/1996 |
| WO | WO 98/38112 A | 9/1998 |
| WO | WO 98/38112 A1 | 9/1998 |
| WO | WO 01/72601 A1 | 10/2001 |
| WO | WO 03/077227 A | 9/2003 |
| WO | WO 03/077227 A2 | 9/2003 |
| WO | WO 03/091036 A1 | 11/2003 |
| WO | WO 2005/016654 A1 | 2/2005 |
| WO | WO 2005/026383 A1 | 3/2005 |

* cited by examiner

APPARATUS AND A METHOD FOR THE PROVISION OF ACTIVATED INDICATORS FOR PRODUCT MARKING AND A PRODUCT MARKING

CROSS-REFERENCE TO RELATED APPLICATIONS

This application is a National Stage of International Application No. PCT/EP2006/007457, filed Jul. 27, 2006, and which claims the benefit of German Patent Application No. DE 10 2005 051 471.5, filed Oct. 21, 2005. The disclosures of the above applications are incorporated herein by reference.

FIELD

The invention relates to an apparatus for the provision of activated temperature-sensitive and/or time-sensitive indicators for product marking, to a method for the provision of such indicators and also to an actual product marking.

BACKGROUND

The statements in this section merely provide background information related to the present disclosure and may not constitute prior art.

The temperature-sensitive and/or time-sensitive indicators are known from the prior art which can be arranged, for example, on a label, on product packaging or directly on a product. Such indicators are suitable for indicating whether a product associated with the indicator was stored in a sufficiently cool manner during the time period it was provided with the indicator and/or whether the product has passed a predetermined age. Indicators are available which are only time-sensitive and are thus independent of the respective temperature so that they can only mark the age of a product. Furthermore, time-sensitive and temperature-sensitive indicators are known which change both in dependence on the respective time past and in dependence on the temperature they have respectively been exposed to. Finally, indicators are also known which are only temperature-sensitive. The present invention relates to all named types of indicators.

A substrate is known from German patent DE 198 03 208 C2 for application onto age-sensitive and temperature-sensitive products or their packaging having a time/temperature indicator arranged in the region of the substrate. The starting time of this time/temperature indicator can be set as desired by light radiation, in particular by UV light radiation, with the indicator containing a matrix and at least one reversible, rechargeable crystalline substance which is embedded therein and which has photochromic properties based on transfer reactions.

The indicator can change color in a photo-induced manner due to the photochromic properties, with a time-dependent and temperature-depending fading taking place subsequently to the color change.

It is known to apply an irreversible photosensitive indicator serving as proof against forgery as a film to the time/temperature indicator. The material of the irreversible indicator turns red, for example, when it is exposed to UV light.

SUMMARY OF THE INVENTION

It is an underlying object of the invention to provide an apparatus and a method of the initially named kind by means of which activated indicators that are secure against manipulation can be provided in a simple manner.

In accordance with a first variant of the invention, this object is satisfied in particular in that a tape guiding device is provided through which a tape is guided via which a protective filter, in particular a UV protective filter, can be applied to an indicator after its activation preferably in an application region of the tape guiding device.

Such a protective filter can be applied to an indicator in a dry state via a tape. An indicator can be covered in a simple manner to prevent a renewed activation by light, in particular by UV light. The tape guiding device can be integrated, for example, into a labeling device so that a provision apparatus can be realized which is simple and compact. It can, for example, be made as a hand-held device or as an automatic labeling device.

Activated labels can be manufactured in a run-through process, in particular a continuous run-through process, and can thus be made available in short cycle times, for example for automatic application.

Preferred embodiments of the first variant of the invention will be explained in the following.

The tape used in accordance with the invention can be made directly as a protective filter tape in accordance with a first alternative. In accordance with a second alternative, the tape guided by the tape guiding device can be a carrier tape on which self-adhesive protective filter labels are arranged which can be removed from the carrier tape in a known manner in order subsequently to be applied to an indicator.

In the first alternative, the tape comprises, for example, linerless labels which have an inherent protective filter function and which are only separated from an adjacent linerless label on application onto the indicator. In the second alternative, in contrast, the protective filter material is located on a surface of a carrier tape, with the protective filter material being able to be transferred to a surface of the indicator from the tape in the manner of a carrier label or by means of a transfer procedure.

If the protective filter material is applied to the indicator in the form of self-adhesive protective filter carrier labels, it is of advantage for the protective filter material to be integrated in the adhesive of the self-adhesive protective filter labels. The carrier of such a label provided with such an adhesive layer then, when the protective filter has been applied, forms a mechanical protective layer for the protective filter material, which is in this case located in the manner of a sandwich between the indicator and the carrier.

When a transfer process is used, in contrast, it is possible to make the tape guided by the tape guiding device as a transfer tape, in particular as a thermal transfer tape. Protective filter material can be transferred onto an indicator from such a transfer tape. When a thermal transfer tape is used, a printing of a label, of product packaging or of a product with protective filter material is additionally also possible. When a correspondingly suitable transfer tape is used, a label, product packaging or a product can therefore also be printed with information, such as product data, outside an indicator.

It is of advantage for a label conveying device to be provided inside the apparatus for the conveying of labels provided with indicators, in particular for the conveying of linerless labels or carrier labels, the conveyor path of the label conveying device extending through the application region of the tape guiding device. Labels provided with indicators can thus be conveyed past the tape guiding device, in particular a stationary tape guiding device, with an application of the protective filter onto the respective indicator taking place during this conveying procedure.

An activation apparatus can be associated with the label conveying device for the activation of indicators by means of light, in particular by means of UV light, with this activation apparatus being arranged in front of the application region of the tape guiding apparatus in the conveying direction of the label conveying device. An activation and a protective filter application subsequent thereto in time can be realized within a single uniform apparatus by such an arrangement.

It is advantageous for at least one application device to be provided with respect to which the tape is guided through the tape guiding device such that a protective filter can be applied to an indicator. The application device ensures that a protective filter is established on the indicator by means of the tape (in particular directly or via material transfer).

Furthermore, at least one printing device can be provided, in particular associated with the label conveyor device. Such a printing device can be used, for example, to transfer protective filter material to the indicator. It is, however, also possible to print labels with information or decorative elements via the printing device.

Different positions of the printing device within the total apparatus are possible:

The printing device can be disposed in front of or after the application region of the tape guiding device in the conveying direction of the label conveying device. In these two cases, however, it is not possible to apply the protective filter to the indicator by means of the printing device. The printing device in these cases rather serves only to print labels, product packaging or products with information or decorative elements.

Furthermore, the printing device can be disposed in front of or after the activation apparatus in the conveying direction of the label conveying device. If it is disposed in front of the activation apparatus, the printing device can in turn only be used for the printing of information or decorative elements and not for the application of the protective filter onto the indicator since the protective filter would then prevent activation. If, however, the printing device is disposed after the activation apparatus, it can be used both for the printing of information or decorative elements and for the application of the protective filter onto the indicator.

The at least one printing device in particular comprises a print head and a mating element. When the printing device is used as an application device for a protective filter, a necessary pressing force or heat action of the tape can be achieved via the print head (which is in particular thermally sensitive) to apply protected filter material.

When the printing device is used for the application of the protective filter onto an indicator, it can have a thermal print head or a heated roll in the region of the tape guiding device. When a thermal print head is used, the geometrical shape of the protective filter to be applied is limited by the grid inherent in the thermal print head. A grid-free shape of the protective filter to be applied can be achieved by the use of a heated roll.

The printing device can in particular be controlled with respect to its action on the tape. Protective filter material can be applied to the indicator by this control possibility in a direct manner adapted to the geometrical dimensions of the indicator. It is thus possible to cover only the indicator itself with protective filter material and not a complete label, for instance.

The protective filter material preferably also covers a comparison field, for example a comparison color field, in addition to the indicator. Indicators used in accordance with the invention change their color in dependence on the time and/or on the temperature. The instantaneous state of the indicator can then be determined using a fixed comparison color field. When the same protective filter material is arranged both on an indicator and on a comparison field, the comparability can be improved, in particular when the applied protective filter is not completely transparent for visible light. Interfering color shifts are therefore avoided since both the reference colors and the indicator are influenced in a respective identical manner by the protective layer disposed thereon.

The at least one printing device is preferably configured such that a label can also be printed directly outside the indicator. In this case, it is possible using one and the same printing device both to apply protective filter material onto an indicator and to print the label with information or decorative elements outside the indicator, with it being a requirement for this that the tape from which the protective filter material and the printing ink should be removed by the printing device is made accordingly.

It is likewise possible for a first printing device to be provided as an application device for a protective filter and a second printing device to be provided for the printing of a label outside an indicator. The two printing devices can be integrated in the same apparatus in order thus to be able to provide activated indicators with protective filters which are arranged on labels printed with information or decorative elements. The first printing device must be provided after the activation apparatus in the conveying direction of the labels, whereas the second printing device can be arranged at any desired position of the label conveying path.

In an alternative embodiment, it is generally also possible for the apparatus in accordance with the invention only to provide labels with activated indicators which are provided with protective filters and then, for example, to make these labels available to a labeling apparatus in which then a printing of the labels with information or decorative elements first takes place.

In accordance with a second variant of the present invention, the initially named object is satisfied in that a tape guiding device is provided by which a tape can be guided via which a protective filter, in particular a UV protective filter, can be applied together with an indicator—after its activation—in an application region of the tape guiding device onto a target surface in particular made as a label, as packaging or as a product.

Unlike the first variant of the invention, the protective filter and the indicator are applied to the target surface together in this case, with the activator having been activated beforehand. This second variant of the invention offers the following advantages which can only be realized in part with the first variant.

It is not necessary to provide every label with an indicator in a compulsory manner since, via a directly controlled activation of the tape guiding device, labels can also be guided past this tape guiding device without an indicator with a protective filter being applied. An application rather only takes place as required, with this application not only being able to take place on a label, but also on packaging or a product. The activation of the tape guiding device can be realized by a selective raising or lowering of the tape guiding device from or onto the target surface respectively. After a raising of the tape guiding device, labels conveyed below it can continue to be conveyed, which then has the result that these labels are not provided with indicators in a desired manner. Only after a lowering of the tape guiding device are labels transported beneath the tape guiding device again equipped with indicators including a protective filter.

An apparatus in accordance with the second variant in accordance with the invention can be used in conjunction with all conventional labels since the labels do not yet have to be equipped with an indicator before they reach the application region of the tape guiding device.

Any conventional label can thus be provided with an indicator with a protective filter.

The fact that the indicator and the protective filter are applied via a tape guiding device, with printing processes being preferred for the application procedure, makes it possible to give the indicator any desired geometrical shape wanted in each case. The shape of the indicator can in particular also differ from one another from target surface to target surface. A refitting of the apparatus in accordance with the invention from one indicator shape to another indicator shape is possible with practically no effort; in particular no rolls of labels have to be swapped for this purpose—unlike in the first variant of the invention.

Preferred embodiments of the second variant of the invention will be explained in the following.

The tape guiding device can be configured for the guidance of a carrier tape, in particular made as a transfer tape or as a thermal transfer tape on which a protective filter layer and simultaneously an indicator layer are arranged, with the indicator layer being located on the side of the protective filter coat remote from the carrier tape. The indicator and the protective filter can thus be applied to the respective target surface in a particularly simple and also variable manner.

A print roll, a print head, a thermal print head or a heated roll can be provided in the application region of the tape guiding device for the application of the compound of protective filter and indicator to the target surface. The use of print rolls or heated rolls produces the advantage already named in connection with the first variant of the invention that the indicator can be given a geometrical shape which is not characterized by any grid.

An activation apparatus for the activation of indicators by means of light, in particular by means of UV light, can be provided in the region of the tape guiding device, with the activation apparatus being aligned to a region of the tape guiding device which is arranged in front of the application region of the tape guiding device. An activation of the indicators therefore takes place here before they are applied to the target surface, which in turn represents a difference to the first variant of the invention.

As also with the first variant of the invention, a label conveying device, in particular for the conveying of linerless labels or carrier labels, can be provided whose conveying path extends through the application region of the tape guiding device. In this case, the tape guiding device can be arranged in a stationary manner since the labels are conveyed past the tape guiding device for the purpose of the simultaneous application of the indicator and the protective filter.

A print head can be associated with the label conveying device, with this print head being able to be arranged in front of or after the application region of the tape guiding device in the conveying direction of the label conveying device. It is therefore possible to provide the target surface with additional decorative elements or information before or after the application of the indicator, with the print head being able to work on the basis of any desired printing techniques.

Preferred embodiments of the invention will be described in the following which can be used both with the first variant and the second variant of the invention.

An applicator device can be associated with the label conveying device for the application of labels which have been activated and provided with a protective filter to product packaging or products, with this applicator device being arranged after the application region of the tape conveying device in the conveying direction of the label conveying device.

The tape guiding device can include a first roll holder and a second roll holder. The tape can thereby be wound off and onto a stock to achieve a band guidance which is, for example, synchronous or asynchronous with the guidance of a carrier tape with labels and indicators.

The first roll holder and/or the second roll holder is/are in particular driven to allow a defined unwinding or winding up of the tape.

Furthermore, a receiver can be provided for a stock of activatable indicators. A large number of activated indicators can thereby be made available within a short period of time. The receiver can be made, for example, to hold a roll in order to be able to activate indicators made available as roll material and, optionally, to be able to provide them with the protective filter.

If, within the framework of the invention, the indicators are not applied directly to product packaging or products, but only to labels, these labels can be made either self-adhesive or not self-adhesive. These labels can furthermore be formed on a linerless label tape or as carrier labels on a carrier tape.

It is particularly advantageous for a photo-sensor connected to an evaluation and control unit to be associated with the activation device for the activation of the indicators, with the evaluation and control unit in particular being configured for the determination of the illumination period and/or the intensity of illumination relative to an indicator or for the compensation of ageing phenomena of the activation device.

In the last-named case, a check can be made by the photo-sensor whether the intensity of illumination of the activation device is still strong enough. If this is not the case, either the intensity of illumination can be ramped up or the illuminants of the activation device can be replaced. When the illumination period and/or the intensity of illumination related to an indicator is/are determined using the photo-sensor, it is possible to document with respect to every single indicator whether and how long and with which intensity of illumination it was activated. This can be significant in the case of complaint when it has to be reconstructed at which position of a production chain a defect is present. It is sensible in this case to associate an individual code with each indicator, the code being stored together with the illumination values in order to be able to carry out an association of these stored illumination values on a later check of an indicator and to be able to determine whether the respective indicator was correctly exposed.

The activation device preferably includes a light source, in particular a plurality of LEDs or UV LEDs which can be connected to the active region of the activation device via at least one light guide, for example. The use of a light guide makes it possible to arrange the light source relatively far away from the active region of the activation device and thus relatively far away from the indicators to be radiated so that it is ensured that the heat development present in the region of the light source does not have a negative effect on the indicators to be activated.

It is furthermore possible to provide at least one light guide between the light source and the photo-sensor. In this case, the photo-sensor for the monitoring of the light source can then be arranged at any desired position. It is therefore not necessary on the use of this light guide to provide the photo-sensor opposite the light source where it could possibly be shadowed by indicators to be activated.

As already mentioned, the indicators preferably adopt a specific color by their activation which changes in dependence on the time and/or on the temperature. An indicator can thereby be made available which has time integration properties or temperature integration properties, with the respective degree of integration being able to be read off from the respective color of the indicator in a simple manner.

A check sensor, in particular a color sensor, connected to an evaluation and control unit, can be arranged after the activation device in the conveying direction of the label conveying device, with the evaluation and control unit preferably being able to be configured for the checking of the correct activation of the indicators or for the compensation of the ageing phenomena of the activation device. When this color sensor is used to compensate ageing phenomena of the activation device, there is only an indirect monitoring of the activation device, in contrast to the use of the aforesaid photo-sensor, since it is not the illumination effect of the light sources of the activation device which is directly investigated by means of the color sensor, but rather its effects on the activated indicators. If an insufficient activation can be found by means of the color sensor with a number of sequential indicators, it can be assumed that the intensity of illumination of the activation device is no longer sufficient. If, however, only individual indicators are activated in too low a degree, it can be assumed that these indicators are erroneous and the activation device is working correctly.

A thermal sensor, in particular a thermal imaging camera, a temperature sensor or a thermometer, can be associated with the activation device for the checking of the heat development on the activation of indicators. In this case, suitable measures, for example a suitable cooling or a production stop, can be triggered in the event of too strong a heat development which could have a negative effect on the indicators.

It is particularly advantageous for an elimination device for incorrectly activated indicators or for labels, product packaging or products provided with such indicators to be provided. Such an elimination device is particularly sensible in conjunction with the color sensor mentioned above with which incorrect activations can be determined.

It is furthermore advantageous for a memory for the detection of operating data and sensor data to be provided in the apparatus in accordance with the invention, with in particular a separate memory position being present for each activated indicator. Alternatively, the memory can also be provided outside the apparatus in accordance with the invention when the apparatus in accordance with the invention has an interface for the writing to such an external memory.

A check can be made subsequently with the help of such a sensor, in particular with respect to each individual indicator, whether the apparatus in accordance with the invention was working correctly and without error so that ultimately a log book function can be realized.

If the named memory should not be used, it is alternatively possible to couple or provide each indicator with a code in which the operating data and sensor data are encoded which apply to the activation time of the respective indicator.

If, however, the memory is used, it is advantageous for each indicator to be provided with an individual number, in particular a running number, which is stored in parallel in the memory. Some or all of the operating data set at the apparatus in accordance with the invention and optionally also the values delivered by present sensors, which were current at the time of the activation of the indicator, can then be associated with the stored number in the memory. In particular the individual number, the activation time period, the absolute activation time, the indicator type used, the product type marked, operating data and/or sensor data specific to the indicator, a manufacturer's code, etc. can be stored in this connection. With knowledge of the number coupled to a respective indicator, a check can thus be made at a later time of the state in which the apparatus in accordance with the invention was at the time of the activation of the respective indicator by reading out the memory; this can be of substantial significance in the case of complaint.

The above-named information which can be stored in the memory can, however, also be applied directly or in encoded form onto a label, product packaging or a product using all the printing apparatus and printing processes described in the framework of this application.

The following possibilities are given, for example, for a control of the apparatus in accordance with the invention by the user:

The user directly inputs the activation time period desired for the respectively used indicators, which is then implemented accordingly by the activation device.

The product type to be marked and, optionally, also the type of packaging used can equally be input, with the apparatus in accordance with the invention determining the respective correct activation time period in dependence on these inputs using algorithms or tables stored in the apparatus.

It is finally also possible for the user to input the type of indicator used or for this type of the indicator to be determined automatically by the apparatus in accordance with the invention, for example by reading a code which is present on a label carrying the indicator. The indicator type thus known is then taken into account in the automated determination of the correct activation time period.

The apparatus in accordance with the invention in accordance with both variants can preferably be integrated in a hand-held device or in an automatic labeling machine which, in addition to the activation device and the tape guiding device, can also have one or more of the components named below in a common housing or at a common support frame: label conveying device, printing device, further printing device, applicator device, receiver for a stock of activatable indicators, photo-sensor, check sensor, thermal sensor, elimination device, memory for the detection of operating data and sensor data.

With a method in accordance with the invention in accordance with the first variant of the invention, the initially named object is satisfied by the activation of an indicator and the subsequent application of a protective filter onto the indicator, with the indicator being conveyed along an activation device and along a protective filter application unit adjacent thereto in the conveying direction. During this conveying process and in particular when the indicator is conveyed past the activation device, it can be located on a label, product packaging or a product. The protective filter is then applied to the indicator after the activation device.

The application of the protective filter preferably takes place via a tape in the form of a self-adhesive label or by means of a printing process, in particular by means of thermal transfer printing. If the protective filter is applied in the form of a self-adhesive label, both linerless labels and carrier labels can be used.

A printing of labels, product packaging or products bearing the indicator can take place between the activation of an indicator and the application of the protective filter. It is particularly preferred if such a printing only takes place when previously, for example by means of a color sensor already mentioned above, a correct activation of the indicator was able to be found. It can then easily be determined in this case, also for an operator of an apparatus in accordance with the invention, whether an indicator was correctly activated or not since only the correctly exposed indicators are coupled with a corresponding print image. Then, in particular when a print image is not present, an ejection of the respective indicator or of a label provided therewith or of product packaging provided therewith or of a product provided therewith can take place.

The protective filter applied using the method in accordance with the invention can cover the indicator and a comparison field surrounding it, which has reference colors, for example, with reference to which the respective state of the indicator can be read off more easily for an observer. As already explained, a protective filter also covering the comparison field has the result that no color shifts can occur for an observer between the comparison field and the indicator.

In accordance with a method in accordance with the second variant in accordance with the invention, the initially named object can be satisfied in that an indicator already connected to a protective filter is activated. In this case, the application of the protective filter after the activation of the indicator is omitted. A compound of indicator and protective filter is rather already activated, with a radiation of the indicator with light being able to take place, for example, from that side on which no protective filter is present.

It is preferred for a compound of indicator layer and protective filter layer to be conveyed along an activation device since this can itself then be made stationary.

The correct activation of the indicator can be checked before the application of the indicator with a protective filter to a label, product packaging or a product. In the event of an incorrect activation, an ejection of the indicator, of a label provided therewith, of product packaging provided therewith or of a product provided therewith then preferably takes place. It is preferred for only the indicator or a label provided therewith to be ejected since in this case no unnecessary elimination of product packaging or products takes place.

It is advantageous when a printing of the label, of the product packaging or of the product takes place before or after the application of the indicator with the protective filter to a label, product packaging or a product.

The compound of activated indicator and protective filter can be applied via a tape in the form of a self-adhesive label or by means of a printing process, in particular by means of thermal transfer printing, onto product packaging or a product.

The invention finally also relates to a product marking, in particular manufactured using an apparatus or a method of the type described above. Such a product marking includes a carrier and an indicator which is arranged at the carrier and which is temperature-sensitive and/or time-sensitive after activation by light, in particular by UV light, with a protective filter, in particular a UV protective filter, being applied, in particular printed, onto the indicator. The carrier mentioned above can be made as a label, packaging or a product.

The carrier or a location outside the indicator arranged at the carrier can be printed on, in particular with data containing information or with decorative elements. Such a print can include at least a code which contains at least one piece of information, preferably a plurality of pieces of information of the following type:

activation time, individual number, indicator-specific operating data and/or sensor data of the application apparatus, indicator type, product type, manufacturer's code.

The mentioned protective filter is preferably also arranged on a comparison field which in particular comprises reference colors. The advantages already explained above can thereby be achieved.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DESCRIPTION OF THE PREFERRED EMBODIMENTS

Figure 1:
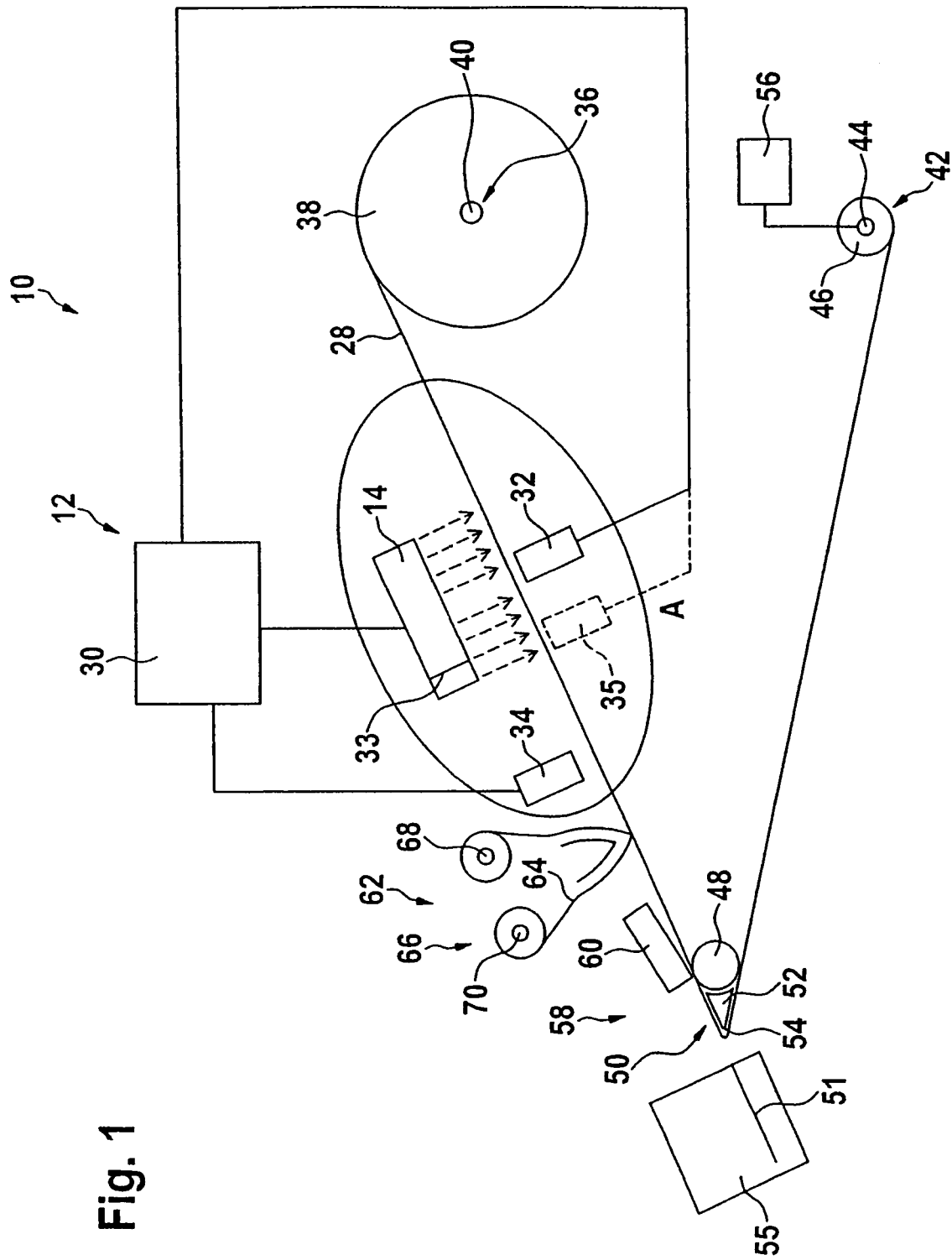
FIG. 1 is a schematic representation of a first embodiment of an apparatus for the provision of activated indicators for product marking in accordance with the first variant of the invention.

The following description is merely exemplary in nature and is not intended to limit the present disclosure, application, or uses. It should be understood that throughout the drawings, corresponding reference numerals indicate like or corresponding parts and features.

Figure 3:
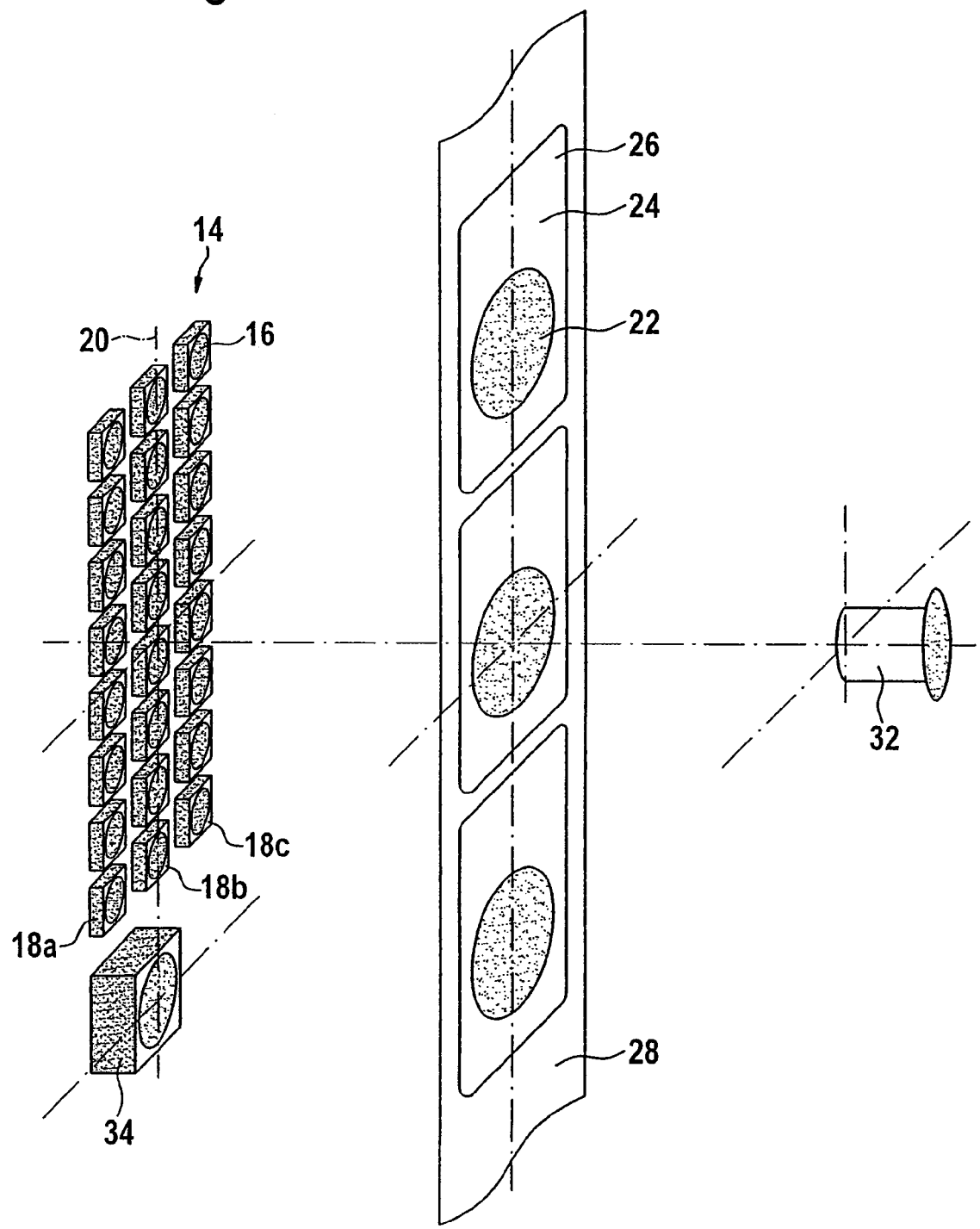
FIG. 3 illustrates an enlarged representation from the region A in accordance with FIGS. 1 and 2 in a perspective view.

A first embodiment of an apparatus for the provision of activated temperature-sensitive and/or time-sensitive indicators for product marking, which is shown in FIG. 1 and is designated there by 10, comprises an activation apparatus 12 for the activation of indicators. The activation apparatus 12 has a UV light source device 14 by which indicators to be activated can be illuminated by UV light. The UV light source device 14 is formed by means of UV light emitting diodes 16 (FIG. 3). The light emitting diodes 16 are arranged in one or more rows 18a, 18b, 18c. The UV light emitting diodes 16 are preferably located on a straight line 20 within a row. Different rows 18a, 18b, 18c are preferably aligned parallel to one another.

The UV light source device 14 is arranged such that a specific areal region can be illuminated by the UV light source device 14. Indicators 22 can be guided through this areal region. The indicators 22 are in particular arranged at a carrier 24, with the carrier 24 preferably being a (printable) label 26. A label 26 can already be printed with one or more comparison fields for an indicator 22; a comparison field is, for example, made as a comparison color field. It is possible in this connection for the labels 26 to be separate or to form a contiguous label tape. It is furthermore possible for the carriers 24 for the indicators 22 again to be arranged on a carrier tape 28 themselves. The labels 26 are, for example, self-adhesive and the carrier tape 28 forms a liner.

It is generally also possible for the labels 26 to be made free of carrier tape as linerless labels.

The activation device 12 comprises a control/regulator apparatus 30 by which the light emission of the UV light source device 14 can be controlled and/or regulated with respect to radiation time and radiation strength (intensity). The control/regulation device 30 in particular controls or regulates the light production at the UV light emitting diodes

16. For this purpose, the current acting on the UV light source device 14 is controlled or regulated to be able to set the intensity of radiation and the radiation time.

Provision is made in this connection for the radiation time to be adjustable at least for a period between 0.05 s and 20 s, and preferably between 0.1 s and 10 s, and for the intensity of radiation furthermore to be adjustable at least in a range between 25 mW/cm$^2$ and 400 mW/c$^2$, and preferably between 50 mW/cm$^2$ up to 200 mW/cm$^2$.

The wavelength of the light which is emitted by the UV light emitting diodes 16 preferably lies between 350 nm and 380 nm.

At least one UV light sensitive photo-sensor 32 is associated with the UV light source device 14. This at least one photo-sensor 32 is arranged opposite the UV light source device 14, with the indicators 22 being able to be guided between the UV light source device 14 and the photo-sensor 32. The intensity of radiation/radiation time of the UV light source device 14 can be checked by the photo-sensor 32. A calibration of the activation apparatus 12 can thereby be carried out, for example, before the insertion of a new label tape. A check can also be made by the photo-sensor 32 (for example before insertion of a new label tape) whether light is being emitted at all by the UV light source device 14. A problem with the UV light source device 14 can thereby be recognized.

A reference light source device 33 can also be provided which is preferably controlled in the same manner as the UV light source device 14. The reference light source device 33 in particular has one or more UV light emitting diodes of the same construction as the light source device 14. A further photo-sensor 35 is associated with the reference light source device 33 and is radiated by this. The photo-sensor 35 and the reference light source device 33 are arranged such that the beam acting on the photo-sensor 35 is not shadowed by labels being led through. Since the reference light source device 33 substantially has the same properties as the UV light source device 14, the latter can be monitored—indirectly—constantly by the photo-sensor 35 and can be readjusted as necessary.

The activation apparatus 12 furthermore comprises at least one check sensor 34 which is arranged, with respect to the carrier or carriers 24 for the indicators 22, on the same side as the UV light source device 14. This check sensor 34 is in particular a color sensor. A check can be made by it after the UV light source device 14 whether an activation actually took place and in the required degree, that is, whether the desired energy transfer to the indicators 22 has actually taken place.

For example, a control loop can be realized with the help of the photo-sensor 32 and the control/regulation device 30, and the ageing of the light sources of the UV light source device 14 (that is, the UV light emitting diodes 16) is automatically readjusted by it in that the intensity of radiation and/or the radiation time is readjusted automatically in accordance with the ageing.

It is generally also possible for no photo-sensor 32 or 35 and only one check sensor 34 to be provided.

The photo-sensor 32 (and optionally the photo-sensor 35) and the check sensor 34 transfer their sensor signals via corresponding lines to the control/regulation device 30. This transmits its control signals or regulation signals to the UV light source device 14 via a corresponding line.

The apparatus 10 comprises a receiver 36 to hold a roll 38. The roll 38 is, for example, a carrier tape roll with a carrier tape 28 which can be unwound and on which the indicators 22 are arranged at corresponding carriers 24 (for example labels 26). The carrier tape 28 is guided between the UV light source device 14 and the photo-sensor 32 and is guided past the check sensor 34.

The receiver 36 comprises a holding mandrel 40 for the roll 38, for example.

A holding device 42 can be provided which in particular comprises a holding mandrel 44 by which a roll 46 with a wound-on carrier band is held.

The apparatus 10 comprises a guide element 48 via which the carrier tape 28 is guided to the holding device 42. A dispenser device 50 for labels is formed at or in the proximity of the guide element 48. Labels 51 can be removed from the carrier tape 28 at the dispenser device 50 and can be removed from the apparatus 10. (The apparatus 10 is then a labeling apparatus.) The dispenser device 50, for example, comprises a wedge-shaped element 52 with a dispensing edge 54.

The roll 46 is formed by a label-free carrier tape, that is, a carrier tape which is label-free due to removal of labels 51 at the dispenser device 50.

An applicator device 55 can be arranged after the dispensing device 50 and labels 51 can be applied to products or product packaging via it. An automatic label application can thereby be realized. Labels (with activated indicators 22) are, for example, automatically applied to products/product packaging guided on a conveyor belt.

The applicator device 55 is made, for example, as a blow applicator, plunger applicator or pressing applicator.

Provision can be made for the holding device 42 to be driven by a drive 56 to wind up the carrier tape accordingly.

It is also possible for the labels themselves to form a tape so that no carrier tape is provided (linerless labels). The guidance of the corresponding label tape in the apparatus 10 is then made such that elements of the guide, which come into contact with an adhesive side of the label tape if the labels are self-adhesive, are provided with an anti-stick coating.

The apparatus 10 comprises at least one printing device 58. The printing device 58 itself has a print head 60 and a mating element and in particular a print roll. The guide element 48 is in particular made as a print roll.

The apparatus 10 moreover has an application device 62 by which a UV protective filter can be applied to an indicator 22 after its activation. A protection of an indicator against manipulation is achieved by the UV protective filter; an indicator 22 cannot be activated again after application of the protective filter so that the apparatus 10 provides irreversibly activated indicators 22.

A UV protective filter can be applied to an indicator 22 via a tape 64 via the application device 62, with the tape having corresponding UV protective filter properties. The application device 62 comprises a tape guiding device 66 for this purpose via which the tape 64 can be guided so that UV protective filters can be applied to the activated indicators 22.

The tape 64, for example, comprises a UV protective filter and is transparent; it can also be self-adhesive, with the filter material preferably being in the adhesive. It is applied to respective applicators 22 in part elements (as labels) or continuously.

The tape guiding device 66, for example, comprises a first roll holder 68 and a second roll holder 70. A tape roll can be placed onto the first roll holder 68 and the tape can be unwound from there. A roll can be wound up via the second roll holder 70. The second roll holder 70 is driven, for example.

The apparatus 10 can be made in compact form. It is made as a hand-held device, for example. It can also be integrated into a labeler with an applicator device 55. Labels can then be provided which have activating indicators 22 and can be applied automatically to products/product packaging.

Figure 2:
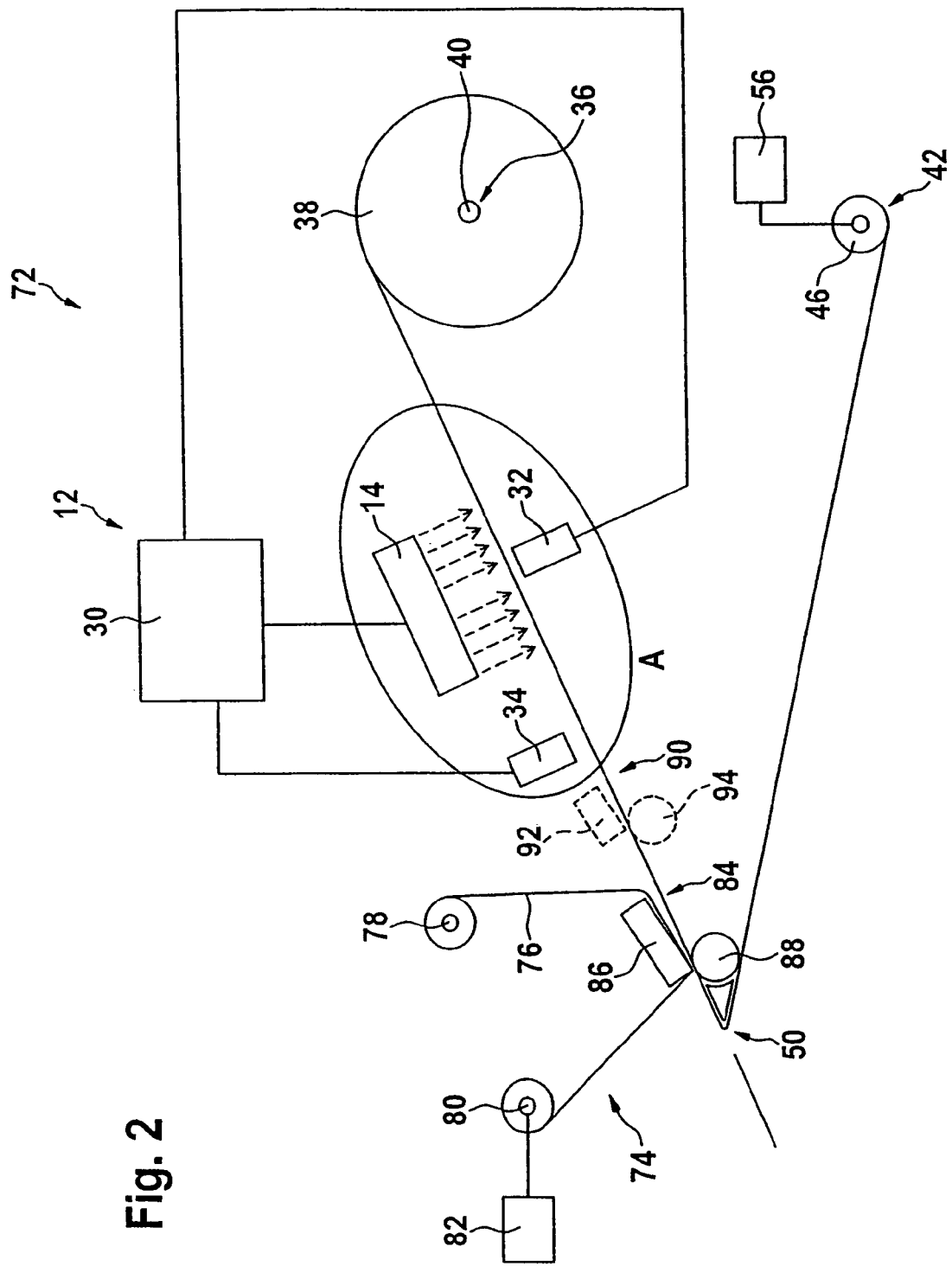
FIG. 2 illustrates a second embodiment of an apparatus for the provision of indicators for product marking in accordance with the first variant of the invention.

In a second embodiment of an apparatus in accordance with the invention, which is shown in FIG. 2 and is designated by 72 there, an activation apparatus 12 is provided which is generally configured the same as the activation apparatus 12 of the apparatus 10. The same reference numerals are therefore used for this activation apparatus of the apparatus 72.

The receiver for a roll 38 is likewise made the same so that the same reference numerals are used. The dispenser device is also generally made the same as described above.

The apparatus 72 comprises a tape guiding device 74 for a transfer tape 76. The transfer tape 76 is a thermal transfer tape, for example.

The tape guiding device 74 has a first roll holder 78 and a second roll holder 80 between which the transfer tape 76 is guided. The transfer tape 76 is in particular wound off from a roll which is seated on the first roll holder 78 and is wound up onto a roll which is seated on the second roll holder 80. The second roll holder 80 is driven by a drive 82, for example.

The apparatus 72 comprises a printing device 84 having a print head 86 and a print roll as a mating element 88. Labels 26 on a label tape or on a carrier tape 28 are guided between the print head 86 and the mating element 88.

The tape guiding device 74 is made such that the transfer tape 76 is led past the print head 86. The transfer tape 76 comprises a UV protective filter material. It can then be applied to corresponding activated indicators 22 by the print head 86.

The print head 86 can be controlled such that UV protective filter material can be applied directly to the indicator 22 in accordance with its geometrical dimensions.

It is generally possible in this connection (if the transfer tape 76 is suitable for it) also to print corresponding labels 26 by the printing device 84 with information such as product information outside the indicator 22.

It is also possible for a second printing device 90 to be provided in addition to the printing device 84 (first printing device) which is arranged between the printing device 84 and the activation device 12 or can be arranged downstream of the printing device 84. The second printing device 90 in particular comprises a print head 92 and a mating element 94. Information can be printed on labels 26 by the second printing device 90 independently of the printing device 84.

Provision can also be made for the apparatus 72 to provide labels having indicators 22 which are activated, provided with UV protective filters and are coupled into a labeling apparatus with a printing device in order to print the labels outside the indicators 22 with information such as product data. It is favorable in this case for the apparatus 72 not to provide individual labels, but a tape such as a label tape or a carrier tape 28 with non-removed labels.

The apparatus 10 and 72 work as follows:

An indicator 22 is made from a material which can be activated by UV light and is temperature-sensitive and time-sensitive; that is, after the material has been stimulated, the stimulation depends on the time after the stimulation and on the temperature. The indicator 22 is in particular a time/temperature indicator having an integration effect with respect to time and temperature. The starting time is determined by the activation time.

Examples for indicator materials are rechargeable, crystalline indicators embedded into a matrix and having photochromic properties based on transfer reactions. Such materials are described, for example, in DE 198 03 208 C2, to which reference is expressly made.

An indicator can, for example, have different colors depending on the time and on the temperature. Provision can be made for at least one fixed comparison color field to be arranged at an indicator 96 (FIG. 4) so that the status can immediately be recognized with the eyes. For example, a first dark color field 98 is provided which indicates the color directly after the activation. A second, somewhat lighter color field 100 can be provided which indicates the color after a medium time period—under the same temperature conditions. A third, even lighter color field 102 can be provided which indicates the color after a longer time period—under the same temperature conditions. The colors of the color fields 98, 100 and 102 are fixed. The color of the first color field, for example, symbolizes a "fresh" state; the color of the second color field 100 a "medium" state; and the color of the third color field 102 symbolizes a "no longer fresh" state, for example.

If only one comparison color field is provided, it symbolizes, for example, the state "to be used" or "no longer fresh".

The color-changing indicator 96 is, for example, circular in shape with the color fields 98, 100 and 102 surrounding the indicator in the manner of ring segments.

Figure 4:
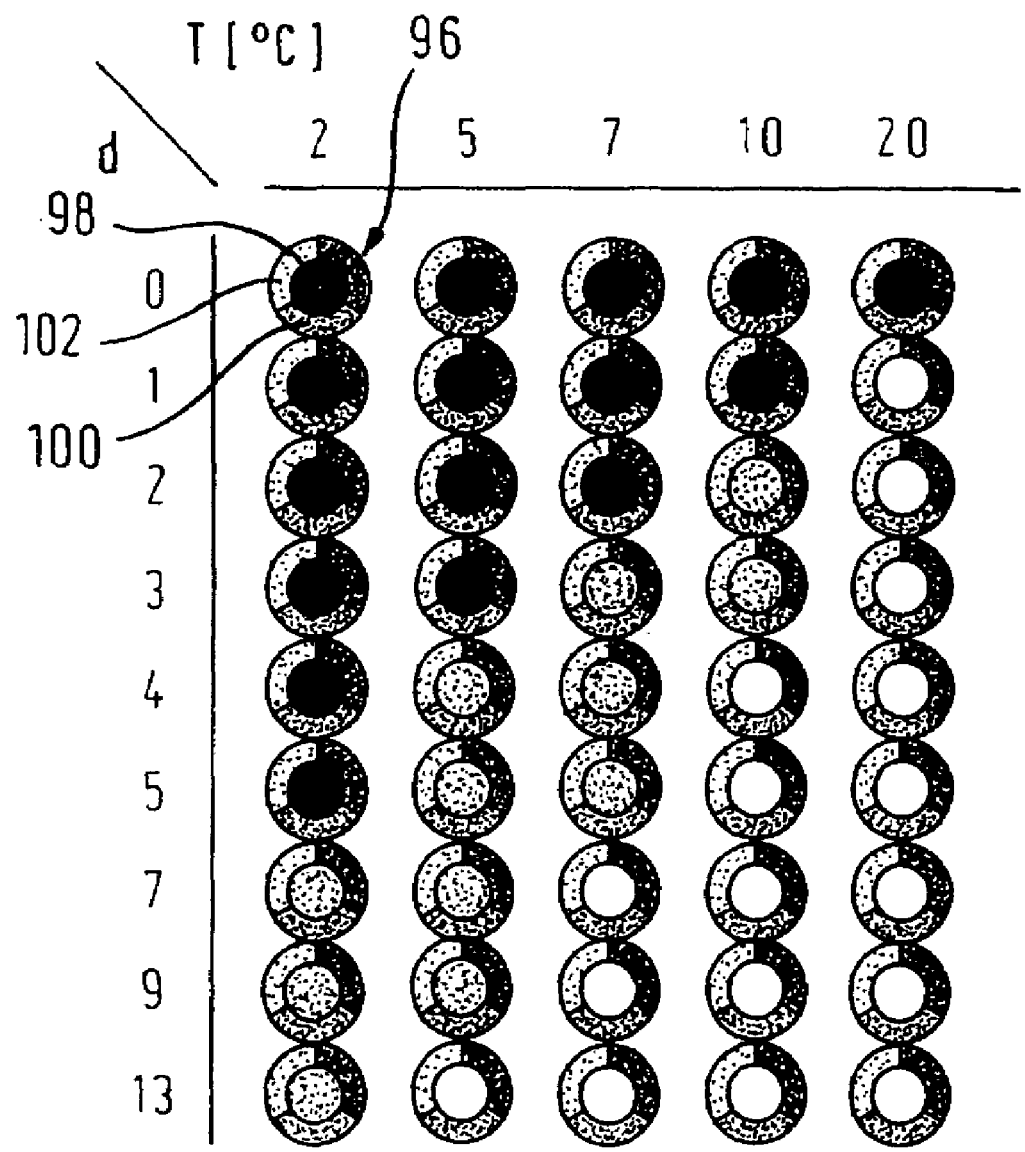
FIG. 4 is a schematic representation of embodiments of an indicator in its time dependence and temperature dependence after the activation.

The color of the indicator 96 changes in accordance with a time/temperature integral, as indicated in FIG. 4, after the activation. At higher temperatures, the color of the indicator 96 changes faster than at lower temperatures with time.

Such an activated indicator 96 can be used for product marking. After application of a corresponding product marking with an indicator 96, this indicator 96 runs through the same time development and temperature development as the product marked by the indicator 96; that is, it is subject to the same time conditions and temperature conditions. The state of the product and in particular the degree of freshness of the product can thereby be visualized by the temperature-sensitive and time-sensitive indicator 96. Foodstuffs can thereby, for example, be marked with respect to their degree of freshness.

The properties of an indicator explained in conjunction with FIG. 4 can also apply in an identical manner to such indicators which are processed using an apparatus in accordance with FIG. 5 explained in the following.

The start time is set by the time of activation. The indicators 96 are supplied to the activation apparatus 12 for this purpose, where an activation by UV light takes place. Due to the activation by UV light, transfer reactions are, for example, photochemically induced in the indicator material, with fading times of different lengths being able to be achieved in dependence on the bonding strength of an acceptor of the transferred species in the acceptor material (cf. DE 198 03 208 C2).

The intensity of radiation and/or the radiation time of the radiation with UV light of corresponding indicators 22, 96 can be set by the control/regulation device 30. The time sensitivity and/or temperature sensitivity of an activated indicator 22 can thereby be set in at least a certain range. For example, with an increased intensity of radiation, a longer fading time can be achieved (with respect to the same temperature conditions). An operator can therefore set the desired properties via the control/regulation device 30.

A calibration of the UV light source device 14 can be carried out via the photo-sensor 32 and a monitoring can be made of whether a defect is present with respect to the lighting.

A check can be made via the check sensor 34, which is in particular a color sensor, of whether an indicator 22 has reached the desired color due to the activation.

A UV protective filter is applied to an activated indicator 22 by the application device 62 or the printing device 84 (which serves as an application device). The indicator 22 is thereby made safe against manipulation since a repeated activation by UV light is no longer possible; that is, the activation is made irreversible by the UV protective filter. A repeated UV light activation would only be possible by removal of the UV protective filter (which would result in a destruction of the indicator 22).

Provision can also be made for a UV protective filter to be applied to the comparison color field or fields. In particular when a UV protective filter is not completely transparent for light in the visible spectrum, the color comparability can thereby be optimized.

The UV protective filter is applied to the indicators 22 via a tape, with the tape being able to be applied directly or (as described with reference to the apparatus 72) with a transfer of UV protective filter material taking place from the transfer tape 76 onto an activated indicator 22. The transfer tape 76 is in particular a thermal transfer tape, such as a carbon tape, on which corresponding UV protective filter material is arranged.

It is transferred onto the indicator 22 via the printing device 84 having the print head 86. The print head 86 can be controlled such that UV protective filter material is "printed" onto the indicator 22 in accordance with the geometrical dimensions thereof.

The present components of a labeling apparatus having a thermal transfer printing apparatus can thereby be used to arrange a UV protective filter on indicators 22.

The indicators 22 are arranged on carriers 24 such as labels 26. The labels 26 are in turn arranged on a carrier tape 28 or are themselves formed on a label tape. The indicators 22 are guided past the UV light source device 14 for activation. The UV protective filter material is applied after activation.

Provision can be made for the corresponding labels 26 to be printed with information such as product data outside the indicators 22. This printing can take place by the apparatus 72 itself (by the second printing device 90 there) or outside the apparatus 72.

It is generally also possible, if a suitable transfer tape 76 is present, for a printing of the labels 26 to take place outside the indicators 22 by the printing device 84.

It is also possible for labels 26 provided by the apparatus 72 and provided with activated indicators 22 to be supplied to a labeling apparatus in which they are printed.

Figure 5:
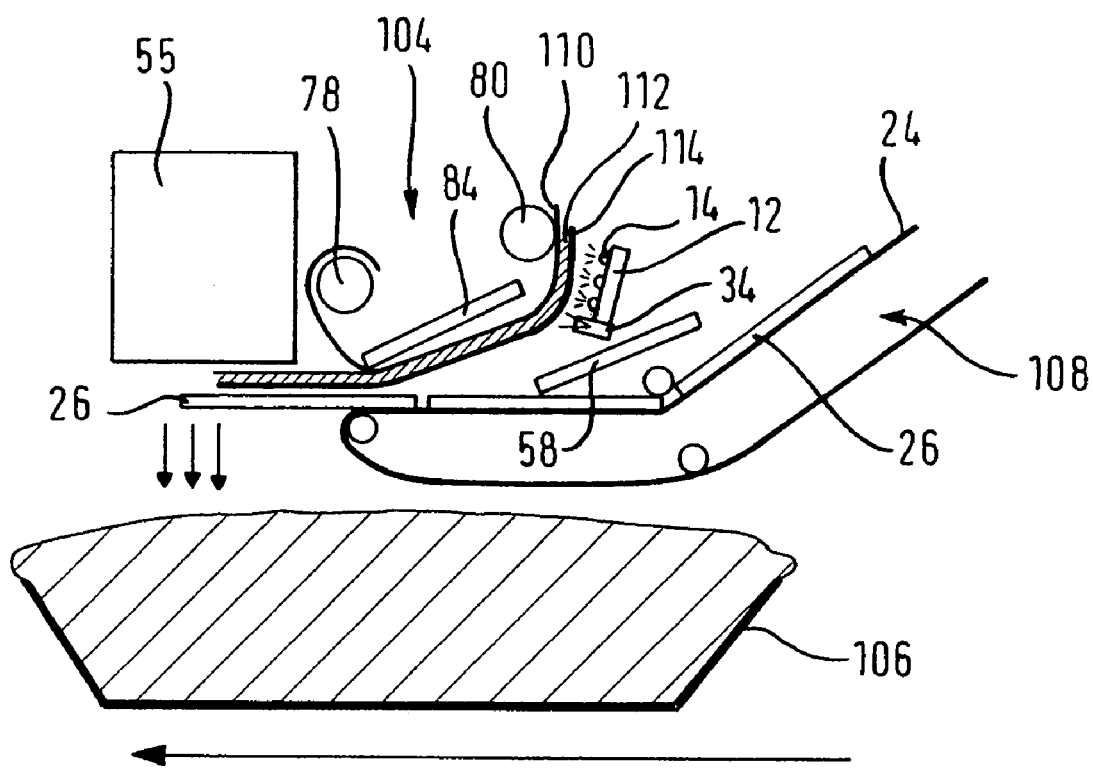
FIG. 5 illustrates a third embodiment of an apparatus for the provision of indicators for product marking in accordance with the second variant of the invention.

FIG. 5 shows a third embodiment of an apparatus in accordance with the invention, with this embodiment being made in accordance with the second variant of the invention.

The same respective reference numerals are used for elements of the apparatus in accordance with FIG. 5 which correspond to those in the apparatus in accordance with FIGS. 1 and 2.

The apparatus shown is equipped with a label conveying device 108 by means of which labels 26 arranged on a carrier tape 24 can be conveyed along a first printing device 58, a tape guiding device 104 with a second printing device 84, up to an applicator device 55. In this connection, the labels 26 can be of a conventional type, which means that they do not have to bear any special indicators or coatings.

If the labels are conveyed past the first printing device 58 by the label conveying device 108, this first printing device 58 can ensure that the labels 26 are printed with information or decorative elements in a respectively desired manner. Some or all the information which was mentioned above (e.g. activation time, individual number, indicator-specific operating data and/or sensor data of the application apparatus, indicator type, product type, manufacturer's code) and which will ultimately be located next to the indicator still to be applied as a rule can in particular be applied here in encoded or unencoded form.

The tape guiding device 104 arranged after the first printing device 58 in the conveying direction of the label conveying device 108 has two roll holders 78, 80 by means of which a 3-layer compound can be conveyed past the printing device 84. The named 3-layer compound comprises a carrier layer 110 which faces the second printing device 84 and which is adjoined by a UV protective filter layer 112 at an indicator layer 114 in the named order.

On an unwinding of the 3-layer compound 110, 112, 114 from the region of the roll holder 80 and a winding up of the carrier layer 110 remaining behind the second printing device 84 in the region of the roll holder 78, the indicator layer 114 is consequently located on the side of the 3-layer compound 110, 112, 114 facing the label conveying device 108 so that the indicator layer 114, as illustrated in FIG. 5, can be acted on by an activation apparatus 12.

The activation apparatus 12 has a UV light source device 14 which comprises a plurality of UV diodes and which acts on the indicator layer 114 with UV light in a controlled and regulated manner after it has left the roll holder 80.

A check sensor 34 made as a color sensor is arranged after the activation apparatus 12 in the conveying direction of the tape guiding device 104 and the correct coloring of the indicator layer 114 can be checked by means of this. The result of this check is then in particular used for the regulation of the intensity of illumination and of the illumination time of the activation apparatus 12.

If it is found that an indicator was not sufficiently activated, the tape guiding device 104 can be raised off the label conveying device 108 so as to move the indicator not correctly activated into the region of the roll holder 78 by a continued drive of the tape guiding device 104 whereby this indicator is practically eliminated (is not used in the further process). The label conveying device 108 can be stopped during this elimination. After a lowering of the tape guiding device 104 subsequent to the elimination of the indicator, that label can also be supplied with a correctly activated indicator which was originally provided for the indicator not correctly activated. Ultimately an uninterrupted flow of labels with correctly activated indicators can thus also be ensured when individual indicators or specific regions of the indicator layer 114 were not correctly activated.

The 3-layer compound 110, 112, 114 with the activated indicator layer 114 then moves into the region of the second printing device 84 after the activation apparatus 12, the printing device being suitable to transfer the indicator layer 114 together with the UV protective filter layer 112 to the surface of a label 26 already printed via the first printing device 58 in a respectively desired geometrical shape.

The finished label 26 with printing, indicator and protective filter then finally moves by means of the label conveying device 108 into the region of an applicator device 55 which is suitable to transfer the finished label 26 with indicator layer and protective filter layer onto a product or a product packaging 106.

The description is merely exemplary in nature and, thus, variations that do not depart from the gist of the present disclosure are intended to be within the scope of the invention. Such variations are not to be regarded as a departure from the spirit and scope of the present disclosure.

The invention claimed is:

1. An apparatus for the provision of activated indicators (22; 96) which are at least one of temperature-sensitive and time-sensitive for product marking, comprising:
   a label conveying device (38, 46) for the conveying of labels on a first tape (28), wherein the labels are provided with indicators (22; 96);
   an activation apparatus (12) associated with the label conveying device (38, 46) for the activation of the indicators (22; 96) by application of UV light; and
   a tape guiding device (66; 74) through which a second tape (64; 76) can be guided via which a UV protective filter can be applied to an activated indicator (22; 96) of the indicators (22; 96) in an application region of the tape guiding device (66, 74);
   wherein the conveying path of the label conveying device (38, 46) extends through the application region of the tape guiding device (66, 74), and the activation apparatus (12) is arranged in front of the application region of the tape guiding device (66, 74) in the conveying direction of the label conveying device (38, 46),
   wherein the label conveying device guides the first tape along a first path and the tape guiding device guides the second tape along a second path, wherein the second path intersects the first path at the application region to enable the UV filter to be applied to the activated indicator.

2. An apparatus in accordance with claim 1, wherein the second tape (64) is made as a protective filter tape or a protective filter can be transferred from the tape (76) onto an indicator (22; 96).

3. An apparatus in accordance with claim 1, wherein the second tape guided by the tape guiding device (74) is a transfer tape (76).

4. An apparatus in accordance with claim 1, wherein the second tape guided by the tape guiding device (74) is a carrier tape on which self-adhesive protective filter labels are arranged.

5. An apparatus in accordance with claim 1, wherein a label conveying device (38, 46) for the conveying of labels provided with indicators is provided whose conveying path extends through the application region of the tape guiding device (66, 74).

6. An apparatus in accordance with claim 1, wherein at least one printing device (58; 84; 90) is provided.

7. An apparatus in accordance with claim 6, wherein the printing device (58; 84; 90) is arranged in front of or after the application region of the tape guiding device (66, 74) in the conveying direction of the label conveying device (38, 46).

8. An apparatus in accordance with claim 6, wherein the printing device (58; 84; 90) is arranged in front of or after the activation apparatus (12) in the conveying direction of the label conveying device (38, 46).

9. An apparatus in accordance with claim 6, wherein the at least one printing device (58; 84; 90) comprises a print head (60; 86; 92) and a mating element (48; 88; 94).

10. An apparatus in accordance with claim 6, wherein the at least one printing device (84) has a thermal print head or a heated roll for the application of a protective filter to an indicator (22; 96) in the region of the tape guiding device (74).

11. An apparatus in accordance with claim 6, wherein the printing device (84) can be controlled with respect to its action on the tape (76).

12. An apparatus in accordance with claim 6, wherein a label (26) can be printed outside the indicator (22; 96) by the at least one printing device (58; 84; 90).

13. An apparatus in accordance with claim 6, wherein a first printing device (84) is provided as an application device for the protective filter and a second printing device (90) is provided for the printing of a label (26) outside an indicator (22; 96).

14. An apparatus for the provision of activated indicators (22; 96) which are at least one of temperature-sensitive and time-sensitive for product marking, comprising:
   a label conveying device (108) for conveying labels on a first tape;
   a tape guiding device (104) through which a second tape can be guided via which a UV protective filter can be applied together with an indicator after its activation, in an application region of the tape guiding device (104) onto a target surface formed as a label (26); and
   an activation apparatus (12) for the activation of indicators by application of UV light that is provided in the region of the tape guiding device (104), with the activation apparatus (12) being aligned to a region of the tape guiding device (104), which region is arranged in front of the application region of the tape guiding device (104);
   wherein the conveying path of the label conveying device (108) extends through the application region of the tape guiding device (104),
   wherein the indicators (22; 96) adopt a specific color by activation, said color changing in dependence on at least one of time and temperature,
   wherein the label conveying device guides the first tape along a first path and the tape guiding device guides the second tape along a second path, wherein the second path intersects the first path at the application region to enable the UV filter with the activated indicator to be applied to the label.

15. An apparatus in accordance with claim 14, wherein the second tape comprises a carrier tape (110) on which a protective filter layer (112) and an indicator layer (114) are arranged, with the indicator layer (114) being located on the side of the protective filter layer (112) remote from the carrier tape (110).

16. An apparatus in accordance with claim 14, wherein one of a print roll, a print head (84), a thermal print head and a heated roll is provided in the application region of the tape guiding device (104) for the application of the protective filter and the indicator to the target surface.

17. An apparatus in accordance with claim 14, wherein an activation apparatus (12) for the activation of indicators by means of light is provided in the region of the tape guiding device (104), with the activation apparatus (12) being aligned to a region of the tape guiding device (104) which is arranged in front of the application region of the tape guiding device (104).

18. An apparatus in accordance with claim 14, wherein a label conveying device (108) is provided for the conveying of linerless labels or carrier labels, and its conveying path extends through the application region of the tape guiding device (104).

19. An apparatus in accordance with claim 18, wherein a print head (58) is associated with the label conveying device (108), with this print head (58) being arranged in front of or after the application region of the tape guiding device (104) in the conveying direction of the label conveying device (108).

20. An apparatus in accordance with claim 14, wherein an applicator device (55) is associated with the label conveying device (38, 46, 108) for the application of labels (26, 51)

which are activated and provided with a protective filter onto product packaging (106) or products, with this applicator device (55) being arranged after the application region of the tape guiding device (66, 74, 104) in the conveying direction of the label conveying device (38, 46, 108).

21. An apparatus in accordance with claim 14, wherein the tape guiding device (66; 74, 104) comprises a first roll holder (68; 78) and a second roll holder (70; 80).

22. An apparatus in accordance with claim 21, wherein at least one of the first roll holder (68; 78) and the second roll holder (70; 80) is driven.

23. An apparatus in accordance with claim 14, wherein a receiver (36) is provided for a stock (38) of activatable indicators (22; 96).

24. An apparatus in accordance with claim 23, wherein the receiver (36) is made for the holding of a roll (38).

25. An apparatus in accordance with claim 17, wherein a photo-sensor (32) connected to an evaluation and control unit is associated with the activation apparatus (12).

26. An apparatus in accordance with claim 17, wherein the activation apparatus (12) comprises a light source.

27. An apparatus in accordance with claim 26, wherein the at least one light guide is provided between the light source and the photo-sensor.

28. An apparatus in accordance with claim 17, further comprising a check sensor that is connected to an evaluation and control unit and that is arranged after the activation apparatus (12) in the conveying direction of the label conveying device (38, 46, 108).

29. An apparatus in accordance with claim 17, further comprising one of a thermal sensor that is associated with the activation apparatus (12) for the checking of the heat development on the activation of indicators.

30. An apparatus in accordance with claim 14, further comprising an elimination device for incorrectly activated indicators or for labels, product packaging or products provided with such indicators.

31. An apparatus in accordance with claim 14, further comprising a memory that is provided for the detection of operating data and sensor data.

32. An apparatus in accordance with claim 3, wherein the transfer tape (76) comprises a thermal transfer tape.

33. An apparatus in accordance with claim 5, wherein the labels comprise linerless labels or carrier labels.

34. An apparatus in accordance with claim 6, wherein the at least one printing device (58; 84; 90) is arranged on the label conveying device (38, 46).

35. An apparatus in accordance with claim 15, wherein the carrier tape (110) comprises a transfer tape.

36. An apparatus in accordance with claim 35, wherein the transfer tape comprises a thermal transfer tape.

37. An apparatus in accordance with claim 17, wherein the light comprises a UV light.

38. An apparatus in accordance with claim 25, wherein the evaluation and control unit is configured for the determination of the illumination period and/or the intensity of illumination related to an indicator or for the compensation of ageing phenomena of the activation device (12).

39. An apparatus in accordance with claim 26, wherein the light source comprises a plurality of LEDs (16), which are connected to the active region of the activating device (12) via at least one light guide.

40. An apparatus in accordance with claim 28, wherein the evaluation and control unit is configured for the checking of the correct activation of the indicators or for the compensation of ageing phenomena of the activation apparatus (12).

41. An apparatus in accordance with claim 29, wherein the thermal sensor comprises one of a thermal imaging camera, a temperature sensor, and a thermometer.

42. An apparatus in accordance with claim 31, wherein a separate memory position is present in the memory for each activated indicator.

43. An apparatus in accordance with claim 1, wherein an applicator device (55) is associated with the label conveying device (38, 46, 108) for the application of labels (26, 51) which are activated and provided with a protective filter onto product packaging (106) or products, with this applicator device (55) being arranged after the application region of the tape guiding device (66, 74, 104) in the conveying direction of the label conveying device (38, 46, 108).

44. An apparatus in accordance with claim 1, wherein the tape guiding device (66; 74, 104) comprises a first roll holder (68; 78) and a second roll holder (70; 80).

45. An apparatus in accordance with claim 44, wherein at least one of the first roll holder (68; 78) and the second roll holder (70; 80) is driven.

46. An apparatus in accordance with claim 1, wherein a receiver (36) is provided for a stock (38) of activatable indicators (22; 96).

47. An apparatus in accordance with claim 46, wherein the receiver (36) is made for the holding of a roll (38).

48. An apparatus in accordance with claim 1, wherein a photo-sensor (32) connected to an evaluation and control unit is associated with the activation apparatus.

49. An apparatus in accordance with claim 48, wherein the evaluation and control unit is configured for the determination of the illumination period and/or the intensity of illumination related to an indicator or for the compensation of ageing phenomena of the activation device (12).

50. An apparatus in accordance with claim 1, wherein the activation apparatus (12) comprises a light source.

51. An apparatus in accordance with claim 50, wherein the light source comprises a plurality of LEDs (16), which are connected to the active region of the activating device (12) via at least one light guide.

52. An apparatus in accordance with claim 51, wherein the at least one light guide is provided between the light source and the photo-sensor.

53. An apparatus in accordance with claim 1, further comprising a check sensor that is connected to an evaluation and control unit and that is arranged after the activation apparatus (12) in the conveying direction of the label conveying device (38, 46, 108).

54. An apparatus in accordance with claim 53, wherein the evaluation and control unit is configured for the checking of the correct activation of the indicators or for the compensation of ageing phenomena of the activation apparatus (12).

55. An apparatus in accordance with claim 1, further comprising one of a thermal sensor that is associated with the activation apparatus (12) for the checking of the heat development on the activation of indicators.

56. An apparatus in accordance with claim 55, wherein the thermal sensor comprises one of a thermal imaging camera, a temperature sensor, and a thermometer.

57. An apparatus in accordance with claim 1, further comprising an elimination device for incorrectly activated indicators or for labels, product packaging or products provided with such indicators.

58. An apparatus in accordance with claim 1, further comprising a memory that is provided for the detection of operating data and sensor data.

59. An apparatus in accordance with claim 58, wherein a separate memory position is present in the memory for each activated indicator.

60. An apparatus in accordance with claim 1, wherein the first tape comprises a carrier tape or a label tape.

61. An apparatus in accordance with claim 14, wherein the first tape comprises a carrier tape or a label tape.

* * * * *